United States Patent Office 3,725,297
Patented Apr. 3, 1973

---

3,725,297
HALOPHOSPHATE PHOSPHOR TREATMENT PROCESS
George R. Gillooly, Cleveland Heights, Ohio, assignor to General Electric Company, Schenectady, N.Y.
No Drawing. Filed Mar. 1, 1972, Ser. No. 231,024
Int. Cl. C09k 1/36
U.S. Cl. 252—301.4 P
5 Claims

ABSTRACT OF THE DISCLOSURE

This invention relates to a washing treatment for a halophosphate type phosphor and more particularly to a washing process for improving the luminescent output of alkaline earth halophosphate phosphors by removing any free antimony residue remaining after phosphor preparation and with modifications of the same washing treatment being further able to remove other residual impurities.

BACKGROUND OF THE INVENTION

Alkaline earth halophosphate phosphors are the luminescent materials most commonly used in fluorescent lamps today. In general, halophosphates are compounds more or less analogous to the natural mineral apatite and can be represented by a formula such as $$3M_3(PO_4)_2 \cdot 1M'L_2$$

where L represents a halogen or mixture of halogens and M and M' represent either different or identical alkaline earth metals or mixtures of such metals. Such artificially produced compounds useful as luminescent materials or phosphors when suitably activated are disclosed in Pat. 2,488,733—McKeag et al. The most commonly used halophosphate phosphor is calcium halophosphate believed to have the following formula:

$$3Ca_3(PO_4)_2 \cdot Ca(F,Cl)_2$$

Antimony is used as an activator to contribute a luminous emission band in the blue region of the phosphor and manganese as a second activator to contribute an emission band in the orange-red region; various qualities or color temperatures are obtained by varying the proportion of these two activators. This phosphor is usually made by mixing $CaHPO_4$, $CaCO_3$, $CaF_2$, $MnCO_3$ and $Sb_2O_3$ together as a dry mixture and firing this mixture in trays at a temperature in the range from 1000–1200° C. It has been established that there are other than pure apatite structures present after the solid phase firing reaction of the phosphor. Some of these materials are antimony oxide, calcium pyrophosphate, calcium antimonate and manganese-containing compounds. When this phosphor is used in electric discharge lamps, particularly in fluorescent lamps, the phosphor is subjected to a number of adverse conditions in lamp manufacture which reduce its response to ultraviolet exciting radiation and its reflectance and transmission of visible light. For instance, the presence of any free antimony residue or antimony compound in the phosphor after preparation can result in poor lamp efficiencies during operation of the lamp made with such phosphor. Likewise, the presence of the manganese and manganese compounds which are not part of the phosphor crystalline structure can also deleteriously affect lamp performance. The free manganese oxides or manganese compounds may be adversely affected by oxiding conditions which can occur at some stages of lamp manufacturing and thereafter absorb both ultraviolet and visible light to lower lamp operating efficiency. If calcium is present in other than the apatite phosphor structure, there can also be a deleterious affect upon lamp performance and lumen maintenance.

A washing process for removing these residual materials after phosphor preparation is disclosed in Patent 3,047,512 which uses an aqueous solution of ethylenediamine tetraacetic acid. The disclosed method can be carried out by agitating the phosphor in an ammoniacal solution of ethylenediamine tetraacetic acid containing 3% or more by weight of ethylenediamine tetraacetic acid relative to the weight of phosphor being washed, thereafter separating phosphor from the liquid, and rinsing the phosphor in water to remove the residual ethylenediamine tetraacetic acid. This method represents an improvement over the other known washing methods which employ different acidic or basic materials to solubilize the same residues for removal from the phosphor in that a lesser concentration of the washing agent can be used. More particularly, there is always a risk in washing the phosphor in that some of the dissolved residue as well as some portion of the washing agent itself can be redeposited on the phosphor crystals after the final water rinse and thereby not completely achieve the desired objective. For this reason and the attendant cost considerations, it becomes desirable to employ as little of the particular washing agent selected as is needed to remove the deleterious residual materials without releasing either any residue or washing agent back into the phosphor or having to employ extra processing steps such as centrifuging to avoid this result.

SUMMARY OF THE INVENTION

Briefly, I have discovered that a significant improvement in brightness, ultraviolet response and efficiency of alkaline earth halophosphate phosphors can be achieved by washing them after preparation with an aqueous solution containing a dissolved alkali metal bitartrate compound to remove residual antimony which is not incorporated or firmly bound into the apatite structure of the phosphor crystal lattice. It has further been found that favorable solubility characteristics of the alkali metal bitartrate compounds in an aqueous solution require approximately only stoichiometric amounts of the washing agent with respect to the residual antimony content on the phosphor surface to effect the removal by dissolution so that solutions as low as 0.001 molar concentration may be used in place of the 5 molar potassium hydroxide solution commonly employed as a conventional base washing method. Moreover, the antimony product formed upon washing is a soluble salt not especially subject to hydrolysis with consequent precipitation and redeposition on the phosphor during the washing or rinsing treatment. It has also been found that aqueous solutions comprising a mixture of the dissolved alkali metal bitartrate compound with a correspondingly low concentration of ethylenediamine tetraacetic acid are effective to remove residual calcium and manganese from the phosphor along with residual antimony during the same washing treatment.

DESCRIPTION OF THE PREFERRED EMBODIMENTS

In carrying out the process of the present invention to remove residual antimony from antimony-activated halophosphate phosphors, the phosphor particles after preparation are contacted with an aqueous solution of an alkali metal bitartrate compound, the phosphor is thereafter separated from the aqueous solution and the washed phopshor is finally rinsed with water or some other suitable liquid solvent to remove any residual alkali metal bitartrate compound. Weight ratios as low as 2% and less by weight of the alkali metal bitartrate compound relative to the weight of the phosphor have been found effective in removing the ordinary residual level of antimony not contained in the phosphor apatite structure when the phosphor has been prepared by conventional manufacturing techniques. The correct amount of a particular alkali metal bitartrate compound to be employed for this purpose need be not greater than the stoichiometric amount dictated by the following chemical equation:

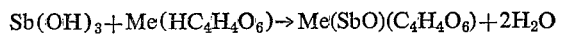

wherein Me is an alkali metal ion with potassium bitartrate being a preferred washing agent by reason of the greater solubility antimony-potassium tartrate (tartar emetic) than potassium bitartrate (cream of tartar) which favors completion of the above-specified reaction. Various modifications of the washing treatment above generally defined can provide an even more efficient phosphor. By way of example, the incorporation of ethylenediamine tetraacetic acid in an aqueous solution of the alkali metal bitartrate compound accomplishes removal of excess calcium and manganese along with residual antimony at similar minimum weight ratios for this sequestering agent relative to weight of the phosphor as was previously stated for the alkali metal bitartrate compound. It should also be possible to provide an aqueous solution comprising mixtures of an alkali metal bitartrate compound with still other washing agents in lesser amounts to provide a more effective means of removing residual calcium, manganese and antimony cations from the phosphor. Likewise, it is contemplated to prepare a solution of the alkali metal bitartrate compound during the washing treatment by reaction between a basic alkali metal compound such as alkali metal hydroxide and tartaric acid using stoichiometric properties of the starting materials so as to produce the bitartrate or acid tartrate reaction product in situ as distinct from the full tartrate compound.

The following exemplary description includes preferred methods for washing a cool-white type phosphor having the chemical composition and physical structure hereinbefore described with aqueous solutions of a selected alkali metal bitartrate compound or an aqueous solution containing such alkali metal bitartrate compound with ethylenediamine tetraacetic acid and the results obtained thereby.

Example 1

Six grams of potassium bitartrate were dissolved in one liter of hot water, and 25 milliliters of the washing solution thus prepared was mixed with 10 grams of the cool-white phosphor. The resulting slurry was heated to the boiling point with rapid stirring and thereafter filtered to remove the wash water containing dissolved antimony from the phosphor particles. The washed phosphor crystals were thereafter rinsed in hot water to remove any residual potassium bitartrate with the free antimony content of the phosphor being measured before and after the washing treatment given. The particular phosphor was found to contain 0.805 weight percent antimony before the washing treatment with said antimony content being reduced to 0.783 weight percent by washing. A brightness test performed by exposing the phosphor to a source of 2537 A. wavelength radiation resulted in 98.7% relative brightness for the unwashed phosphor which rose to 100.2% relative brightness after the washing treatment.

Example 2

The same composition phosphor used in Example 1 was washed with aqueous solutions containing ethylenediamine tetraacetic acid or mixtures of ethylenediamine tetraacetic acid with potassium bitartrate. The treated phosphors were then suspended in suitable vehicular suspension system to provide a fluorescent lamp coating in a 40-watt fluorescent lamp and the lamp performance measurements compared for these washing treatments.

The washing procedure employing a mixture of potassium bitartrate with ethylenediamine tetraacetic acid was accomplished in the following manner. Fifteen grams of tartaric acid were added to approximately 10 liters of hot deionized water with stirring. Thereafter a quantity of 5.6 grams of potassium hydroxide pellets was dissolved in a small quantity of hot deionized water and then added to the tartaric acid solution already formed. Approximately 1500 grams of the sifted phosphor was added to the freshly prepared potassium bitartrate solution with stirring and an additional quantity of 12.5 liters of hot deionized water was added to the solution while being maintained at approximately 80° C. The slurry was held at said temperature for approximately 5 minutes after which approximately 18 grams of ethylenediamine tetraacetic acid was added to the slurry with stirring being continued for an additional 45 minute time period. At the end of this washing period, the slurry was filtered to separate the phosphor from the washing liquid, and the washed phosphor cake then rinsed with hot deionized water to remove any residual ethylenediamine tetraacetic acid and potassium bitartrate. The rinsed phosphor was then centrifuged and a lamp suspension formed in the conventional manner.

The washing procedure used to remove residual calcium, manganese and antimony from the same phosphor with ethylenediamine tetraacetic acid alone is described in the previously referenced 3,047,512 patent, hence need not be repeated again in detail. In brief, an embodiment of said process was carried out for comparison purposes whereby the same washing treatment described immediately above which employed an aqueous solution of potassium bitartrate prepared in situ with ethylenediamine tetraacetic acid was repeated without using any alkali metal bitartrate compound. The relative lamp performance of the 3000-lumen rated 40-watt fluorescent lamps of these different washing treatments is reported in the table below.

TABLE

| Washing treatment | Initial lumen output | 100-hour operation lumen output |
| --- | --- | --- |
| Ethylenediamine tetraacetic acid | 3,228 | 3,151 |
| Ethylenediamine tetraacetic acid with potassium bitartrate | 3,235 | 3,162 |

It can be noted from the above comparison that a washing treatment in accordance with the present invention provides a significant lumen gain at initial lamp operation and after 100 hours operation.

It will be apparent from the foregoing description that a washing treatment has been provided to improve the luminescent output of alkaline earth halophosphate phosphors and that various modifications can be made in the preferred embodiments shown. Consequently, it is intended to limit the present invention only to the scope of the following claims.

What I claim as new and desire to secure by Letters Patent of the United States is:

1. A process to remove residual antimony from antimony-activated halophosphate phosphors which comprises contacting the phosphor particles with an aqueous solution of an alkali metal bitartrate, separating the phosphor from the aqueous solution, and rinsing the phosphor to remove residual alkali metal bitartrate and antimony compounds.

2. A process as in claim 1 wherein the aqueous solution comprises a mixture of alkali metal bitartrate with another washing agent.

3. A process as in claim 2 wherein the washing agent is ethylenediamine tetraacetic acid.

4. A process as in claim 1 wherein the alkali metal bitartrate is produced in the aqueous solution by reaction between a basic alkali metal compound and tartaric acid.

5. A process as in claim 1 wherein the alkali metal bitartrate is potassium bitartrate.

References Cited

UNITED STATES PATENTS

| | | | |
|---|---|---|---|
| 3,047,512 | 7/1962 | Martyny | 252—301.4 P |
| 3,060,129 | 10/1962 | Hoekstra et al. | 252—301.4 P |
| 3,384,598 | 5/1968 | Friedman et al. | 252—301.4 P |
| 3,485,767 | 12/1969 | Ogrinc | 252—301.4 P |
| 3,538,013 | 11/1970 | Graff | 252—301.4 P |

OTHER REFERENCES

Wanmaker et al.—The Preparation of Calcium Halophosphate—Philips Research Reports, vol. 10, pp. 11–38, February 1955.

ROBERT D. EDMONDS, Primary Examiner